United States Patent [19]

Hehl

[11] 4,380,427

[45] Apr. 19, 1983

[54] COMPACT HYDRAULIC DRIVE FOR DIE CLOSING UNIT OF INJECTION MOLDING MACHINE

[76] Inventor: Karl Hehl, Arthur-Hehl-Strasse 32, 7298 Lossburg 1, Fed. Rep. of Germany

[21] Appl. No.: 324,625

[22] Filed: Nov. 24, 1981

[30] Foreign Application Priority Data

Nov. 24, 1980 [DE] Fed. Rep. of Germany ....... 3044137

[51] Int. Cl.³ .............................................. B29F 1/06
[52] U.S. Cl. .................................. 425/590; 425/451.2
[58] Field of Search ............................ 425/451.2, 590

[56] References Cited

FOREIGN PATENT DOCUMENTS

| 1529937 | 8/1970 | Fed. Rep. of Germany . |
| 563568 | 8/1944 | United Kingdom . |
| 1014093 | 12/1965 | United Kingdom . |
| 1212510 | 11/1970 | United Kingdom . |
| 1460291 | 12/1976 | United Kingdom . |

Primary Examiner—Thomas P. Pavelko
Attorney, Agent, or Firm—Joseph A. Geiger

[57] ABSTRACT

A hydraulic actuator assembly for a push-type die closing unit of an injection molding machine capable of producing rapid die opening and closing movements with a small volume of pressurized fluid and an elevated die closing pressure in the closed die position, the assembly comprising a central power cylinder with a selectively bypassable power piston and two parallel, diametrally oppositely arranged single-acting travel cylinders. The low-pressure space on the forward side of the power piston is open to the pressure spaces of the two travel cylinders, and the total effective area of these pressure spaces is larger, by a relatively small amount, than the area of the high-pressure space to the rear of the power piston, said small amount determining the fluid volume necessary for the opening travel. A stationary plunger cooperates with a central bore in the rear portion of the power piston rod to produce a small pressure space for the closing travel. An elevated die closing pressure is obtained by pressurizing the high-pressure space of the power piston and the plunger pressure space, with the power piston bypass closed.

12 Claims, 6 Drawing Figures

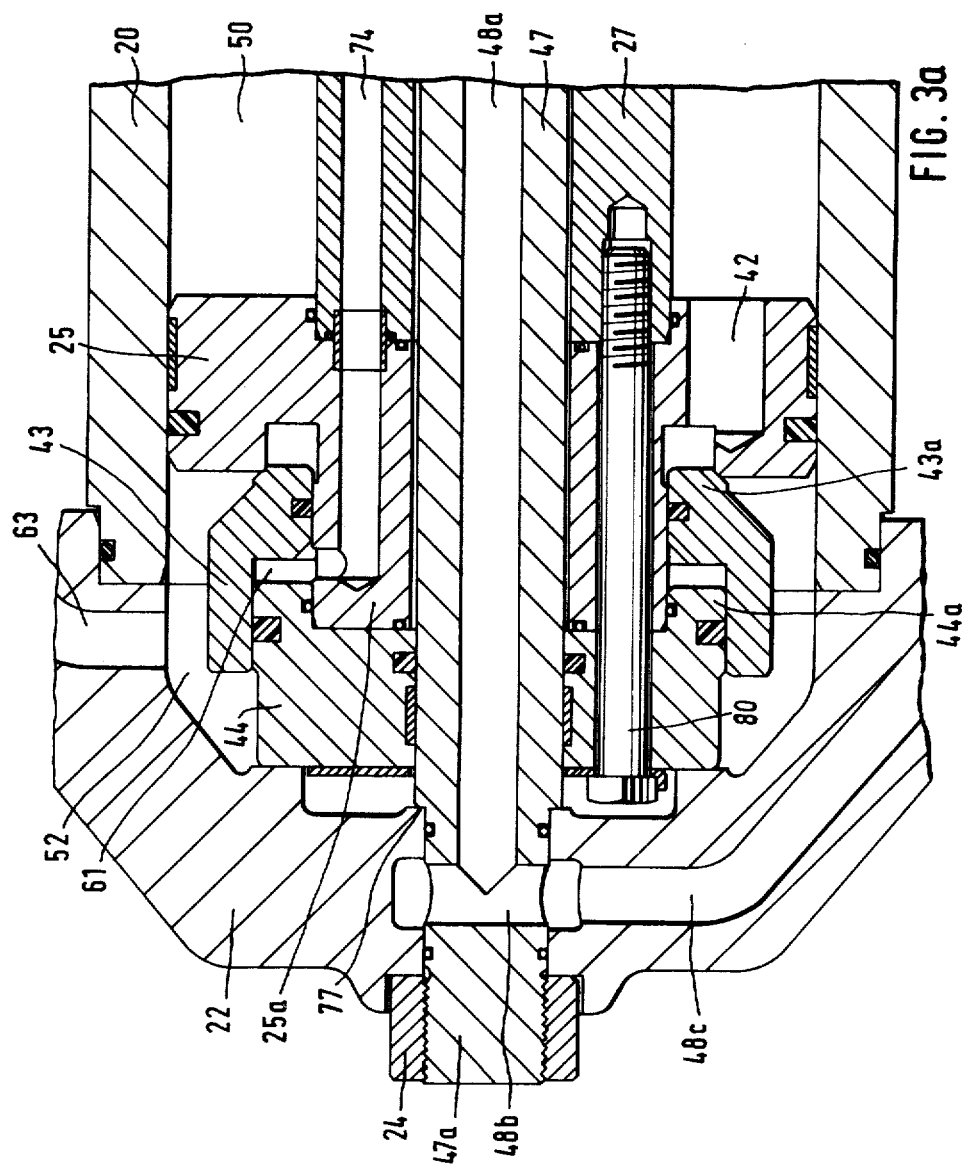

COMPACT HYDRAULIC DRIVE FOR DIE CLOSING UNIT OF INJECTION MOLDING MACHINE

BACKGROUND OF THE INVENTION

1. Field of the Invention

The present invention relates to injection molding machines and, more particularly, to a hydraulic actuator assembly driving the die closing unit of an injection molding machine of the type in which the injection molding die is pushed closed and the closing pressure is produced by a single axially aligned power cylinder.

2. Description of the Prior Art

Various push-type die closing units with axially aligned power cylinders are known from the prior art. Also known is an arrangement of a power cylinder which has a power piston with bypass passages for rapid opening and closing movements of the die closing unit during which the power piston moves through the hydraulic fluid in the power cylinder, rather than displacing fluid from one axial side, while replacement fluid enters the cylinder from the other axial side.

While the bypassable power piston is thus "neutralized" during the rapid opening and closing movements of the die closing unit, its piston rod may be arranged to act as a differential piston for one of the two travel movements. A single-acting auxiliary cylinder extending in the same axis as the power cylinder will then provide the opposite travel movement.

Die closing units with a hydraulic actuator assembly of this type are disclosed in U.S. Pat. No. 4,047,871 and in U.S. Pat. No. 4,105,390. This hydraulic actuator assembly has a piston rod which extends through the power cylinder and into an attached auxiliary cylinder, or travel cylinder, carrying an auxiliary piston at its distal extremity. The power piston has a number of internal axial bypass channels which are surrounded by a circular valve seat. Cooperating with the latter is an axially movable annular valve plunger which, under the influence of a pressure space arranged between the valve plunger and a piston rod shoulder, can be pressed against the valve seat to close the bypass channels, when the power piston is to be pressurized for the creation of an elevated die closing pressure.

The piston rod of the power piston extends forwardly from the power cylinder, into engagement with a movable die carrier frame. The piston rod portion which extends rearwardly into the auxiliary cylinder is of smaller diameter. Accordingly, the piston rod itself is a differential piston, producing a die closing movement, when the power piston bypass is open and the power cylinder is pressurized. The coaxial travel cylinder produces the die closing movement.

This configuration of a hydraulic actuator assembly has the disadvantage of requiring considerable space in the axial direction. Both the power cylinder and the coaxial closing travel cylinder must accommodate a longitudinal stroke which corresponds to the maximum opening movement of the die closing unit, with the result that the axial length of the die closing unit is more than three times the maximum distance of the opening stroke of the die closing unit.

It is also known from the prior art to arrange a multi-cylinder hydraulic actuator assembly in such a way that smaller drive cylinders extend parallel to, and on diametrally opposite sides of a main cylinder, all three cylinders having their piston rods connected to a transverse plate member to produce a cumulative die closing pressure. Such an arrangement is disclosed in the German Offenlegungsschrift (Published Application) No. 1 529 937.

This publication suggests a hydraulic actuator assembly which has a conventional double-acting main cylinder arranged in the axis of the die closing unit and two smaller clamping cylinders arranged parallel and on diametrally opposite sides of the main cylinder. The die opening and closing movements are produced by the main cylinder, and the two clamping cylinders enter into action only, when the injection molding die is to be clamped shut under high pressure.

This is accomplished by means of clampable pistons in the clamping cylinders which, when subjected to an elevated hydraulic pressure, develop a clamping action between the pistons and their otherwise freely movable piston rods, thereby adding the forces created by the pressure spaces of the clamping cylinders to the force of the main cylinder. A solenoid valve controls two hydraulic lines which connect the high pressure space of the main cylinder with the pressure space of the clamping cylinders.

This arrangement, aside from its complexity in terms of the hydraulically clampable pistons in the lateral clamping cylinders, utilizes the main piston to produce the opening and closing travel of the die closing unit, thus requiring the displacement of large quantities of hydraulic fluid during each machine cycle, if the main cylinder is to be large enough to produce the necessary die closing pressure.

SUMMARY OF THE INVENTION

Underlying the present invention is the primary objective of creating a compact hydraulic actuator assembly which, while retaining the advantages of the bypassable power piston and separate travel cylinder, suggests a novel, compact arrangement of the travel cylinder that does not double the length of the hydraulic actuator assembly, as has been the case in the past.

The present invention proposes to attain this objective by suggesting an improved hydraulic actuator assembly for a push-type die closing unit of an injection molding machine which has a central power cylinder with a bypassable power piston and two laterally and diametrally oppositely arranged travel cylinders with transversely connected piston rods for a rapid die opening travel, as well as a centrally arranged stationary plunger which cooperates with a bore of the power piston rod to produce a rapid die closing travel.

In a preferred embodiment of the invention, the power cylinder is so arranged that, during the opening travel, the power piston is being bypassed internally, as the fluid from the larger high-pressure space flows through axial bypass channels of the piston into the smaller low-pressure space, and the excess fluid is displaced from the low-pressure space of the power cylinder into the pressure spaces of the two single-acting travel cylinders.

For this purpose, the invention suggests a permanent internal communication between the low-pressure space of the power cylinder and the pressure spaces of the two travel cylinders. The combined displacement volume of the latter is preferably somewhat larger than the volume of excess fluid which is displaced out of the power cylinder in an opening travel with bypassed power piston. This means that the actuator assembly requires only a relatively small volume of pressurized fluid to execute the opening stroke. The same small volume of hydraulic fluid is displaced out of the assembly during the closing travel, provided the power piston is again being bypassed.

The preferred embodiment of the invention further suggests the arrangement inside the piston rod of the power piston of a cylinder bore which cooperates with a stationary hollow plunger, so as to create a small pressure space between the piston rod bore and the plunger. This plunger pressure space, when supplied with pressurized fluid, produces a forward displacement of the piston rod and power piston, for a die closing travel which requires a comparatively small volume of hydraulic fluid. As in the die opening travel, the power piston is being bypassed during the die closing travel. The fluid volume required by the plunger pressure space for the closing travel is preferably approximately the same as the fluid volume which is required by the pressure spaces of the combined power cylinder and travel cylinders for the opening travel.

In the closed position of the injection molding die, the pressure in the plunger pressure space can be augmented by the supply of pressurized fluid to the high-pressure space of the power piston, following the hydraulic closing of the bypass channels in the power piston. The total effective pressure space for the die closing pressure then corresponds exactly to the full cross section of the power cylinder bore.

The proposed hydraulic actuator assembly thus offers a dual advantage, inasmuch as it requires only approximately one-half the axial space of the prior art hydraulic actuator, and inasmuch as the entire cross-sectional area of the power piston bore is being used as a pressure space for the generation of the closing pressure. This compact arrangement not only means a weight reduction for the hydraulic actuator assembly, it also offers the possibility of providing a pivotability of the die closing unit into a vertical orientation, under constraints which would not have previously permitted such a pivotability. Obviously, the reduction in weight of the proposed hydraulic actuator assembly is particularly advantageous for all die closing unit configurations in which the hydraulic actuator assembly is supported in a cantilever-type mounting arrangement.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 3a shows a further enlarged portion of the assembly cross section of FIG. 3, with minor modifications;

DESCRIPTION OF THE PREFERRED EMBODIMENT

Figure 1:
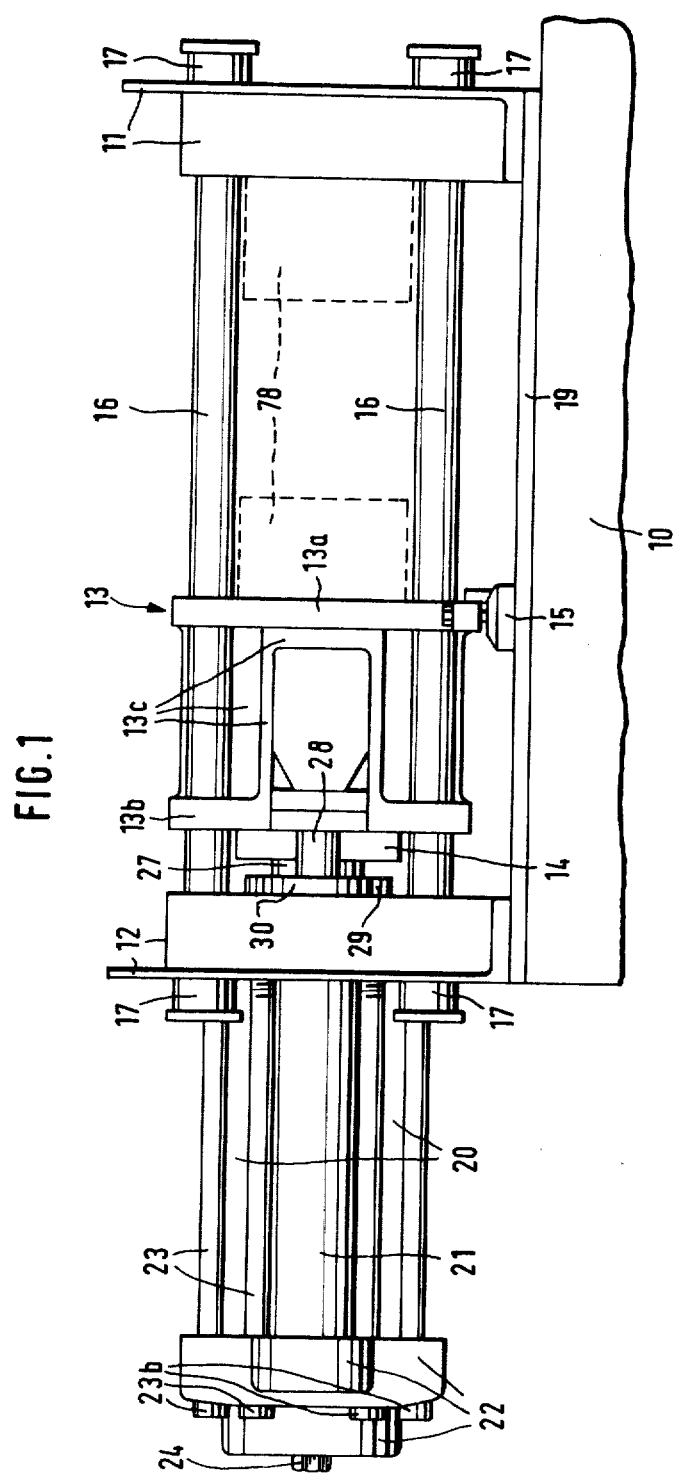
FIG. 1 is a frontal elevational view of a die closing unit featuring a compact hydraulic actuator assembly as an embodiment of the present invention.
Figure 2:
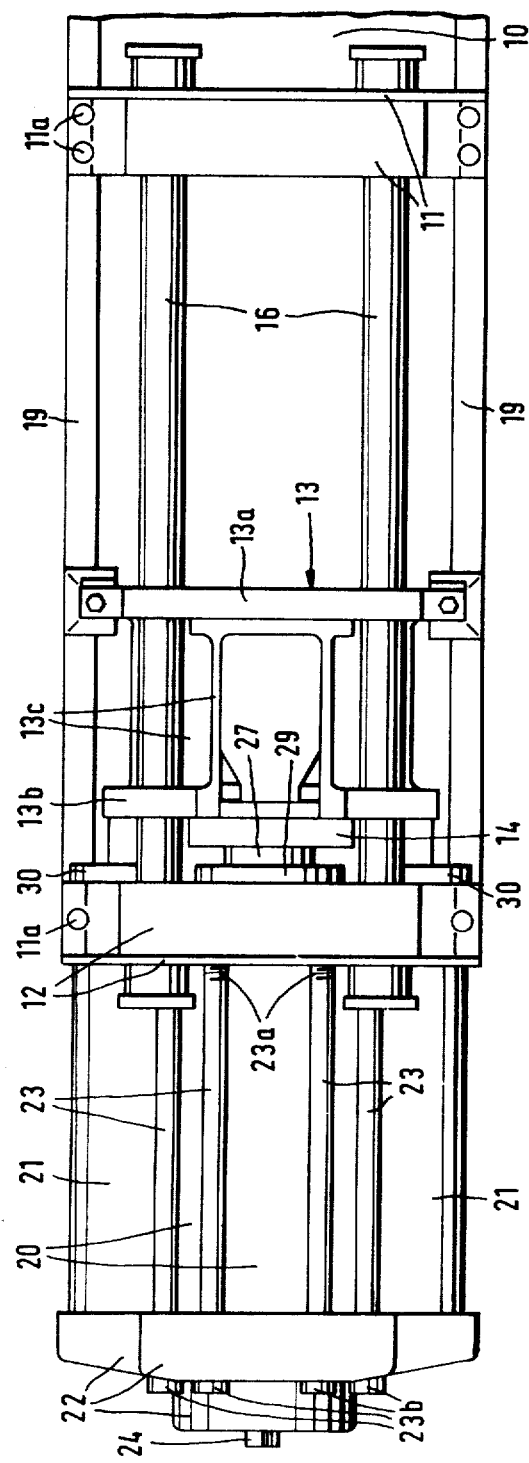
FIG. 2 shows the die closing unit of FIG. 1 in a plan view.

Referring to the drawings, FIGS. 1 and 2 show a die closing unit mounted on the machine base 10 of an injection molding machine. The die closing unit includes a stationary die carrier plate 11 and a stationary cylinder head plate 12 arranged at a considerable axial distance from each other and bolted to the machine base 10 by means of mounting bolts 11a. The stationary die carrier plate 11 carries the stationary half of an injection molding die 78. Four parallel tie rods 16 extend axially between the die carrier plate 11 and the cylinder head plate 12, their extremities being rigidly clamped to these plates by means of special preloaded tie rod connections 17. The plates 11 and 12 and the tie rods 16 thus form a rigid frame structure for the die closing unit.

The four tie rods 16 support and guide a movable die carrier frame 13 which carries a movable die half in axial alignment with the stationary die half on the die carrier plate 11. The movable die carrier frame 13 consists of a transverse die mounting wall 13a on its forward side, a transverse pressure transfer wall 13b on its rear side, and a number of reinforcing ribs which extend axially between the transverse walls 13a and 13b. In the case of a die closing unit which has comparatively long tie rods, as is the case in the example shown, the die mounting wall 13a of the movable die carrier member 13 may be equipped with an auxiliary support in the form of a pair of sliding shoes 15 which engage sliding ledges 19 on opposite sides of the machine frame 10.

The opening and closing movements of the movable die carrier frame 13 are produced by means of a hydraulic actuator assembly which is mounted in a cantilever-type support on the rear side of the cylinder head plate 12, in alignment with the longitudinal center axis of the die closing unit. This hydraulic actuator assembly is shown in greater detail in FIGS. 3 and 3a.

Figure 3:
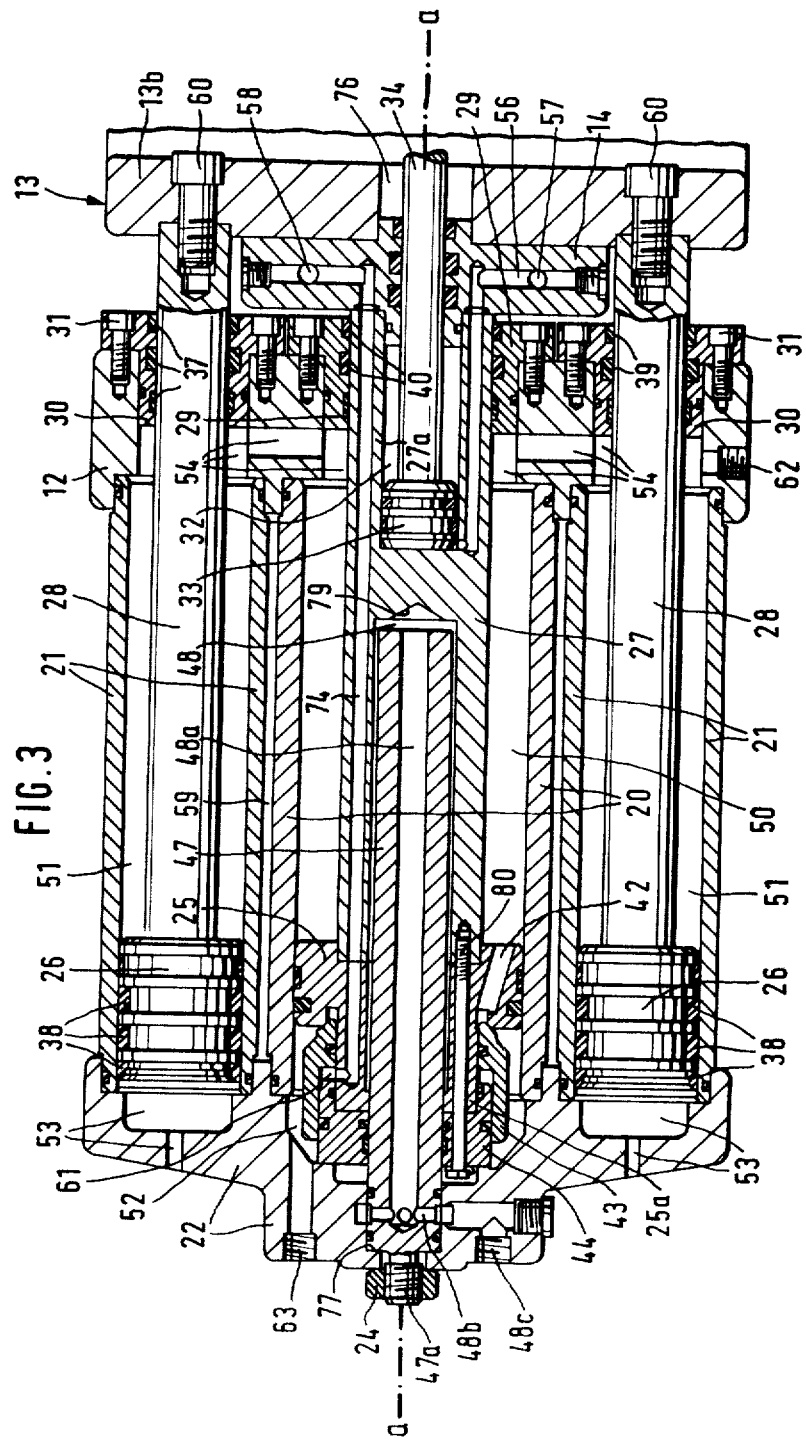
FIG. 3 represents an enlarged horizontal longitudinal cross section through the hydraulic actuator assembly of FIGS. 1 and 2.

FIG. 3 shows that the actuator assembly includes a power cylinder 20 in the center axis of the die closing unit and two parallel travel cylinders 21 which are arranged on diametrally opposite sides of the power cylinder 20. The piston rods 27 and 28 of the cylinders 20 and 21, respectively, extend through the stationary cylinder head plate 12 and are rigidly connected to the pressure transfer wall 13b of the movable die carrier frame 13. The power piston rod 27 includes, for this purpose, an enlarged piston base plate 14 with an axial centering extension engaging a centering bore 76 of the pressure transfer wall 13b. The piston rods 28 of the two travel cylinders 21 are simply clamped into centering recesses of the wall 13b by means of clamping bolts 60.

Figure 4:
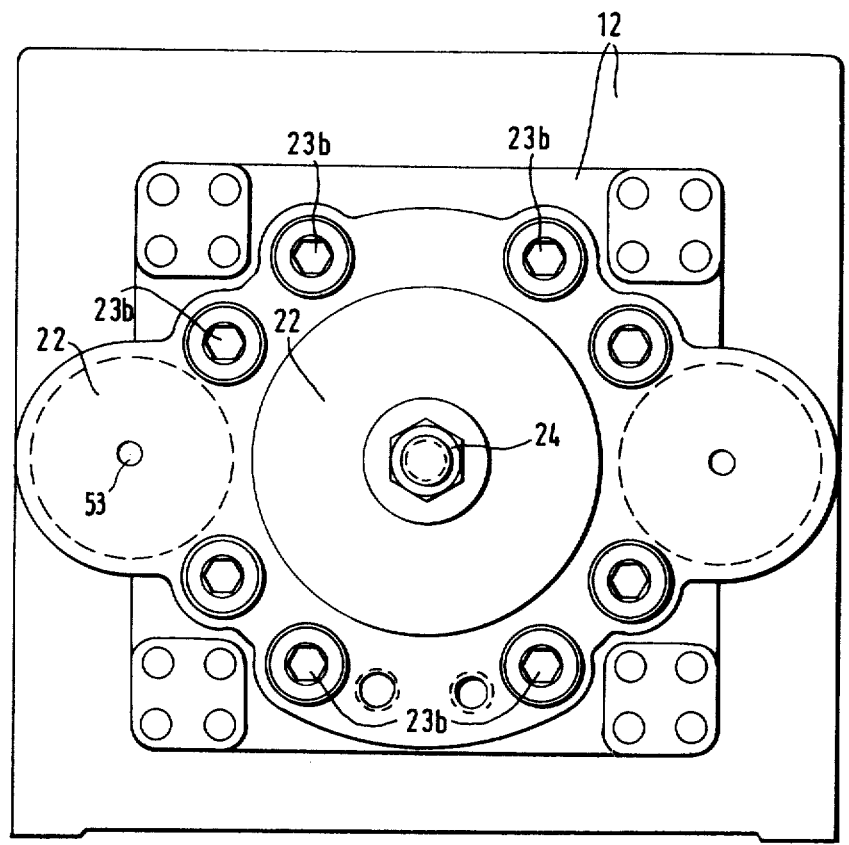
FIG. 4 shows the die closing unit of FIGS. 1-3 in an elevational end view, as seen from the rear side.

FIG. 3 also shows that the central power cylinder 20 and the two lateral travel cylinders 21 are cylinder sleeves of identical axial length. The forward extremities of the three cylinder sleeves are centered in appropriate centering recesses of the cylinder head plate 12, and their rearward extremities are similarly engaged in centering recesses of a cylinder cover 22 which forms the opposite axial end of the hydraulic actuator assembly. Eight cylinder tie bolts 23 clamp the cylinder cover 22 to the cylinder head plate 12 by means of threaded shaft portions 23a engaging threaded bores of plate 12. The heads 23b of the tie bolts are visible in FIG. 4.

Where the three piston rods extend through the cylinder head plate 12, the latter has enlarged throughbores inside which are mounted two lateral guide covers 29 for the travel piston rods 28 and a central guide cover 29 for the power piston rod 27. The guide covers are secured in place by means of bolts 31, and in their bores are arranged suitable gaskets 37, 39 and 40 which form seals for the piston rods 28 and 27.

The lateral travel cylinders 21 cooperate with travel pistons 26 on the piston rods 28 to form single-acting hydraulic cylinder assemblies. When pressurized fluid is pumped into their pressure spaces 51, they produce an opening travel of the die closing unit by pulling the movable die carrier frame 13 in the rearward direction. On the rear sides of the travel pistons 26 are pressureless spaces 53 which are open to the atmosphere. Appropriate piston rings 38 provide a seal between the travel pistons 26 and the cylinder bores of the travel cylinders 21.

On the much heavier power piston rod 27 of the power piston 20 is seated a power piston 25 which separates the interior space of the power cylinder 20 into a high-pressure space 52 on the rear side of the power piston 25 and a low-pressure space 50 on the forward side of the power piston 25. Connecting channels 54 in the cylinder head plate 12 form permanently open passages between the pressure spaces 51 of the two travel cylinders 21 and the low-pressure space 50 of the power cylinder 20. Rearward portions of the annular gaps formed by the enlarged throughbores for the guide covers 29 and 30 in the cylinder head plate 12 form a part of the connecting channels 54.

The rear extremity of the power piston rod 27 rides on a stationary plunger 47 which is attached to the cylinder cover 22, as can be seen in FIGS. 3 and 3a. By sealingly reaching into an axial bore of the power piston rod 27, the stationary plunger 47 forms a plunger pressure space 48 which, when pressurized, produces an opening travel of the movable actuator subassembly consisting of the three piston rods 27 and 28, their three pistons 25 and 26, and the movable die carrier frame 13.

The stationary plunger 47 is seated in a centering bore of the cylinder cover 22, being clamped against a shoulder 77 of cover 22 by means of a clamping nut 24 which engages a shaft portion 47a of plunger 47. A hydraulic supply line 48c in the cylinder cover 22, an aligned short radial channel portion 48b, and a long axial channel portion 48a in the plunger 47 lead to the plunger pressure space 48.

In the forward end portion 27a of the power piston rod 27 is arranged still another cylinder assembly which serves as a hydraulic drive for an ejector device (not shown). In the cylinder bore 32 of this assembly is arranged a small piston 33 on a piston rod 34 which reaches axially forwardly through the piston base plate 14, into the movable die carrier frame 13. A hub portion of the piston base plate 14 serves as a guide cover and seal for the piston rod 34. Bores 56 and 57 in the piston base plate 14 and an aligned axial bore in the piston rod portion 27a supply pressurized fluid to the rear side of the ejector piston 33.

The power piston 25 on the power piston rod 27 features a controllable bypass between the low-pressure space 50 and the high-pressure space 52 on its opposite axial sides. This bypass takes the form of a number of axial bypass channels 42 in the power piston 25. The openings of the bypass channels 42 on the high-pressure side of piston 25 are arranged inside the annular valve seat which forms part of a bypass valve. The movable member of this bypass valve is an annular valve plunger 43 which opens and closes the power piston bypass by moving axially away from or into contact with the valve seat on the high-pressure side of the power piston 25.

The annular valve plunger 43 has a flange 43a with which it cooperates with the valve seat and which has a first bore in sliding engagement with a first surface portion of the power piston rod 27, at a diameter which is considerably smaller than the diameter of the valve seat. A larger rearward portion of the valve plunger 43 forms a second bore in sliding engagement with a second surface portion of the power piston rod 27, at a diameter which is slightly larger than the diameter of the valve seat. Transitional shoulders between the two cylindrical surfaces of the power piston rod 27 and the two cooperating bores of the annular valve plunger 43 form opposing axial walls of a valve plunger pressure space 61 (FIG. 3a).

The two sliding surfaces of the power piston rod 27 which carry the annular valve plunger 43 are actually surface portions of a collar extension 25a of the power piston 25 and of a piston rod head 44. The collar extension 25a, while being an integral part of the power piston 25, forms an axial extension of the piston rod 27. The power piston 25 engages the rearward extremity of the power piston rod 27 with a centering recess, and its collar extension 25a, in turn, is centered inside a centering recess of the piston rod head 44. A number of bolts 80 reach through the piston rod head 44 and the power piston 25 into threaded bores of the power piston rod 27, to form a rigid connection between these parts.

A bore in the piston rod head 44 conveniently serves as a guide bore and seal for the stationary plunger 47. A long axial bore 74 in the power piston rod 27 forms a portion of a hydraulic supply channel which extends from a channel connection 58 in the piston base plate 14 to the valve plunger pressure space 61.

Figure 5:
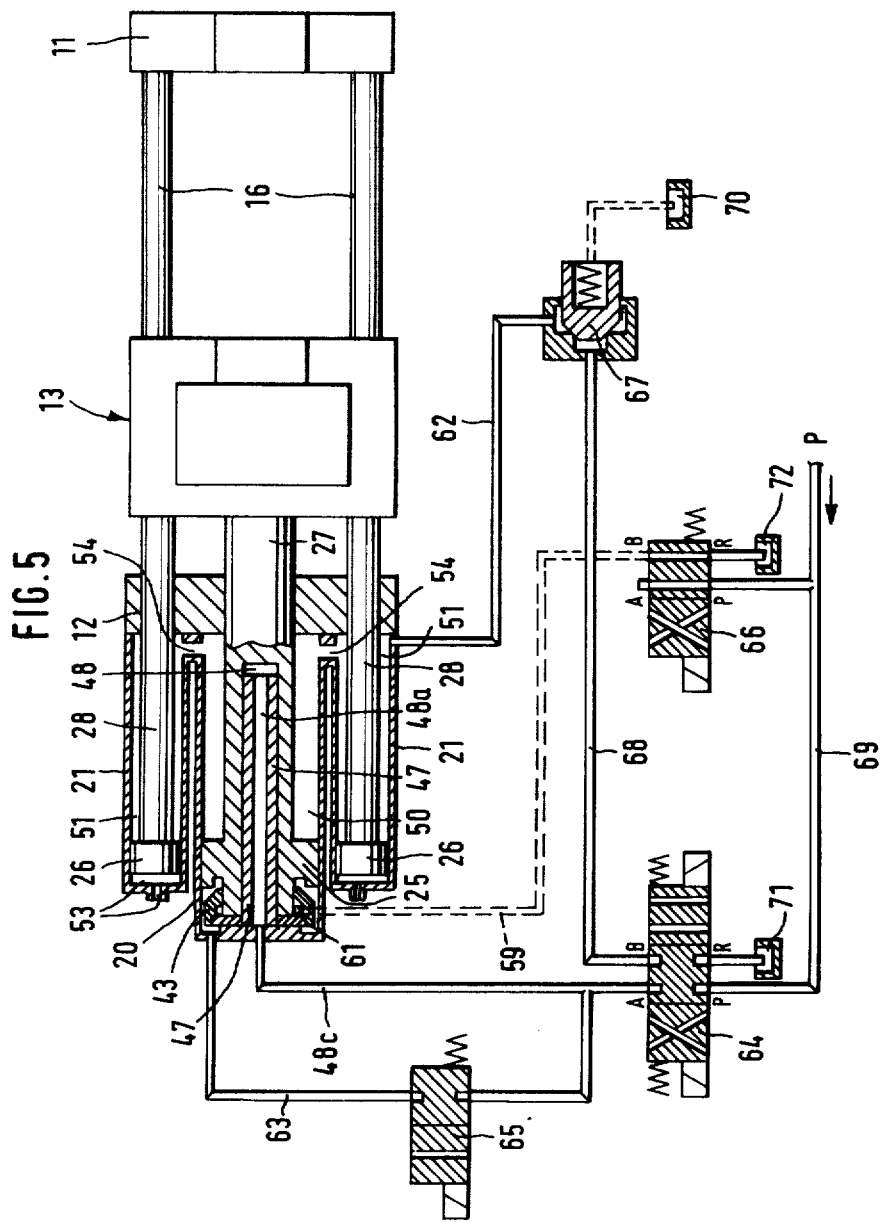
FIG. 5 is a schematic representation of the die closing unit of the invention and its major hydraulic control components.

FIG. 5 shows a schematic arrangement of a set of hydraulic control valves and supply lines which control the operation of the hydraulic actuator assembly of the invention. The main control valve 64 is movable between a closed position and two open positions for opposite flows in the lines 48c and 68 which control the supply of pressurized fluid to, and conversely, the discharge of fluid from the pressure space 48 of the stationary plunger 47 and the pressure spaces 51 of the two travel cylinders 21 which communicate with the low-pressure space 50 of the power cylinder 20. A return valve 67 in the low-pressure supply line 62, 68 produces a throttling and damping action.

A closing pressure shutoff valve 65 in a line branch 63 controls the supply of pressurized fluid to the high-pressure space 52 of the power cylinder 20, in conjunction with the supply of pressurized fluid to the pressure space 48 of the stationary plunger 47. Lastly, a simple reversing valve 66 supplies pressurized fluid to the valve plunger pressure space 61. For the sake of clarity, FIG. 5 shows a dotted supply line 59 to the pressure space 61, in the place of the actual supply line which runs to the movable die carrier frame 13 and from there, axially through the power piston rod 27.

Assuming an initially closed position of the die closing unit, the hydraulic actuator assembly proposed by the present invention operates as follows.

In the assumed closed position of the injection molding die 78, the movable die carrier frame 13 and its attached piston rods 27 and 28, with their respective pistons 25 and 26, are positioned in their forward end position which is determined by the particular dimensions of the injection molding die 78. An opening travel involves the rearward movement of the entire movable actuator subassembly. For this purpose, the main control valve 64 in FIG. 5 is displaced to the right, so that pressurized fluid is supplied to the cylinder head plate 12 through the low-pressure supply line 62. At the same time, the supply channel 48c is connected with the fluid reservoir 71. The reversing valve 66 is in the position shown in FIG. 5, signifying a pressureless valve plunger pressure space 61.

The supply of pressurized fluid to the connected pressure spaces 50 and 51 on the forward side of the pistons 25 and 26, respectively, produces a rearward movement of the latter, as the travel pistons 26 advance against the pressureless spaces 53 and the power piston 25 moves through the fluid inside the power cylinder 20, thanks to its bypass channels 42 and an open valve plunger 43. The latter opens automatically, when the pressure in the high-pressure space 52 exceeds the pressure in the valve plunger pressure space 61, due to the fact that the second guide diameter between the valve plunger 43 and the piston rod head 44 is larger than the diameter of the valve seat of the power piston 25.

However, as the power piston rod 27 moves rearwardly towards the cylinder cover 22, a greater volume of fluid is diaplaced out of the larger high-pressure space than is allowed to enter the smaller low-pressure space. Consequently, a volume of fluid corresponding to the difference between the two pressure space areas will flow from the power cylinder 20 into the connected pressure spaces 51 of the two travel cylinders 21.

To the extent that the combined area of the two travel cylinder pressure spaces 51 is only moderately larger than the difference between the two pressure spaces of the power cylinder 20, the supply of a relatively small volume of pressurized fluid through the low-pressure supply line 62 will produce a rapid opening travel of the movable actuator subassembly. At a given area differential between the high-pressure space and the low-pressure space of the power cylinder, a larger combined area of the travel cylinder pressure spaces will produce a slower, but more powerful opening travel. As the three piston rods and their pistons move in the rearward direction, hydraulic fluid is displaced out of the pressure space 48 of the stationary plunger 47, returning through the supply channel 48c and the open main control valve 64 to the fluid reservoir 71.

The closing travel of the actuator assembly involves correspondingly inverted hydraulic flow conditions, as pressurized fluid is pumped into the pressure space 48 of the stationary plunger 47 and a certain volume of fluid is discharged from the assembly through the low-pressure supply line 62. The bypass valve of the power piston 25 is again open.

It may be desirable to have identical effective pressure space areas for identical force levels in the opening and closing travels of the movable actuator subassembly. In this case, the area of the plunger pressure space 48 would have to be equal to the net pressure space area which creates the force for the opening travel. This net pressure space area is the area by which the combined travel cylinder pressure spaces 51 exceed the difference between the two pressure spaces of the power cylinder 20. And, in view of the fact that this difference is exactly equal to the area of the plunger pressure space 48, the combined area of the travel cylinder pressure spaces 51 would have to be twice as large as the area of the plunger pressure space 48. In other words, identical opening and closing forces are produced by the actuator assembly, when the effective area of the pressure space 51 of each travel cylinder 21 is the same as the effective area of the pressure space 48 of the stationary plunger 47.

Following the closing travel of the moving parts of the die closing unit, the hydraulic actuator assembly is switched to a closing pressure mode in which an elevated closing pressure is applied to the movable die carrier frame 13, and, through the latter and the supporting stationary members of the die closing unit, to the closed halves of the injection molding die 78. This is accomplished by opening the shutoff valve 65 in the high-pressure supply line 63, at the same time as the reversing valve 66 for the power piston bypass valve is switched to its pressure-supply position. The latter action causes the annular valve plunger 43 to close the bypass of the power piston 25. The simultaneous application of pressure to the high-pressure space 52 of the power piston 25 and to the pressure space 48 of the plunger 47 means that the total effective area for the die closing pressure corresponds exactly to the cross-sectional area of the bore of the power cylinder 20.

It should be understood, of course, that the foregoing disclosure describes only a preferred embodiment of the invention and that it is intended to cover all changes and modifications of this example of the invention which fall within the scope of the appended claims.

I claim the following:

1. A compact hydraulic actuator assembly adapted for use in a die closing unit of an injection molding machine as a rapid-travel opening and closing drive as well as a source of elevated die closing pressure, which die closing unit includes a stationary cylinder head plate and a movable die carrier member guided for die opening and closing travel along the center axis of the die closing unit, its die closing travel being a movement away from the stationary cylinder head plate in an axially forward direction, said hydraulic actuator assembly comprising in combination:

a power cylinder extending rearwardly from the cylinder head plate, in alignment with the center axis of the die closing unit, the power cylinder having a cylinder bore cooperating with a power piston on a piston rod which extends sealingly through the cylinder head plate and is connected to the movable die carrier member;

a cover on the rearward extremity of the power cylinder defining a high-pressure space between it and the power piston;

a closable power piston bypass in the form of at least one bypass channel connecting the high-pressure space of the power cylinder with a low-pressure space of the power cylinder defined between the power piston and the cylinder head plate, the effective area of the high-pressure space being larger than the effective area of the low-pressure space so that, when the power piston moves rearwardly with its piston bypass open, a volume of excess fluid corresponding to the difference between the two pressure space areas is displaced out of the power cylinder;

a travel cylinder arranged parallel to the power cylinder and extending likewise rearwardly from the cylinder head plate, the travel cylinder having a cylinder bore cooperating with a travel piston on a piston rod which extends sealingly through the cylinder head plate and is likewise connected to the movable die carrier member, for movements in unison with the power piston;

a travel cylinder pressure space defined between the travel piston and the cylinder head plate, the effective area of the travel cylinder pressure space being larger than said difference between the two pressure space areas of the power cylinder by a predetermined, relatively small net opening travel area;

a flow connection between the low-pressure space of the power cylinder and the travel cylinder pressure space so arranged that, when the pistons move rearwardly as aforesaid, said excess fluid is displaced from the low-pressure space of the power cylinder into the pressure space of the travel cylinder, and the additional entry into one of said connected pressure spaces of a pressurized fluid volume corresponding to the net opening travel area creates the rearward movements of the pistons, whereby an opening travel of the movable die carrier member is produced with a relatively small volume of pressurized fluid;

means for hydraulically closing the power piston bypass; and means for supply pressurized fluid to the high-pressure space of the power piston, so as to create an elevated die closing pressure against the movable die carrier member in the closed position of the die closing unit, when the power piston bypass is closed.

2. A compact hydraulic actuator assembly as defined in claim 1, further comprising:

a stationary plunger extending axially forwardly from the cover on the rearward extremity of the power cylinder into a cooperating blind cylinder bore in the axis of the power piston rod, thereby defining a plunger pressure space between the forward end face of the plunger and the bottom of the blind cylinder bore whose area equals said difference between the two pressure space areas of the power cylinder and is therefore smaller than the pressure space of the travel cylinder; and means for supplying pressurized fluid to the plunger pressure space, for the creation of a forwardly directed force on the power piston rod which, when the power piston bypass is open, produces a closing travel of the movable die carrier member with a relatively small volume of pressurized fluid.

3. A compact hydraulic actuator assembly as defined in claim 2, wherein the stationary plunger has a rearward end portion seated in a shoulder bore of the cover of the power cylinder;

the plunger includes threaded means for the creation of a clamped rigid connection between the plunger and said cover; and the plunger further includes an axial bore opening into the plunger pressure space, as part of said means for supplying pressurized fluid to the plunger pressure space.

4. A compact hydraulic actuator assembly as defined in claim 2, wherein the travel cylinder is a single-acting cylinder; and the effective area of the travel cylinder pressure space is twice as large, while the net opening travel area is equal to, the effective area of the plunger pressure space, so that identical volume of pressurized fluid produce the opening and closing travels of the movable die carrier member.

5. A compact hydraulic actuator assembly as defined in claim 2, wherein the travel cylinder is arranged in the form of two single-acting travel cylinders which extend parallel to the power cylinder, on diametrally opposite sides of the latter; and the effective pressure space area of each of the two travel cylinders is equal to the effective area of the plunger pressure space and also equal to said net opening travel area, so that identical volumes of pressurized fluid produce the opening and closing travels of the movable die carrier member.

6. A compact hydraulic actuator assembly as defined in claim 2 wherein the high-pressure space of the power cylinder and the plunger pressure space are pressurizable simultaneously, when the die closing unit is in its closed position and the power piston bypass is closed, so that the effective area for the creation of the closing pressure is equal to the cross-sectional area of the power cylinder bore.

7. A compact hydraulic actuator assembly as defined in any one of claims 1 through 6, wherein the power cylinder and the travel cylinder, or travel cylinders, respectively, are cylinder sleeves of substantially identical length, the forward extremities of the cylinder sleeves being centered and seated in shoulder bores of the cylinder head plate, and the rear extremities of the cylinder sleeves being similarly centered and seated in shoulder bores of the cover of the power cylinder; and the assembly further includes a plurality of threaded cylinder tie members pulling the cylinder cover against the cylinder head plate, so as to axially clamp the cylinder sleeves between the cylinder cover and the cylinder head plate.

8. A compact hydraulic actuator assembly as defined in any one of claims 1 through 6, wherein the cylinder head plate has enlarged throughbores forming gaps with the associated piston rods of the power cylinder and travel cylinder, or travel cylinders, respectively, which extend through the plate; and in each of the throughbores is arranged a guide cover which serves a guide and seal for the associated piston rod.

9. A compact hydraulic actuator assembly as defined in claim 8, wherein the flow connection between the low pressure space of the power cylinder and the pressure space of the travel cylinder, or travel cylinders, respectively, is constituted, at least in part, by rearward end portions of said throughbore gaps in the cylinder head plate and by connecting channels extending transversely between said throughbore gaps.

10. A compact hydraulic actuator assembly as defined in any one of claims 1 through 6, wherein the valve means for hydraulically closing the power piston bypass includes:

an annular valve seat on the high-pressure side of the power piston surrounding the bypass channel, or channels, of the latter;

an annular valve plunger serving as a movable valve member in cooperation with the valve seat, the valve plunger having a forward portion in the form of a glange with a first bore in sliding engagement with a first surface portion of the power piston rod of smaller diameter than the valve seat, the valve plunger further having a rearward portion forming a second bore in sliding engagement with a second surface portion of the power piston rod of larger diameter than the valve seat;

a valve plunger pressure space defined between the first surface portion of the power piston rod and the second bore of the annular valve plunger and between axially oppositely facing transitional shoulders of the power piston rod and valve plunger; and a pressure supply channel extending from a connection at the movable die carrier member, via an axial channel portion in the power piston rod, to the valve plunger pressure space, so that, when pressurized fluid is pumped into said pressure space, the annular valve plunger is moved against the valve seat to close the power piston bypass, and when a pressure is present in the high-pressure space of the power cylinder, in the absence of a pressure in the valve plunger pressure space, the valve plunger is moved away from the valve seat to open the power piston bypass.

11. A compact hydraulic actuator assembly as defined in claim 10, wherein the power piston has on its forward side a centering recess with which it engages the rearward extremity of the power piston rod;

the smaller first surface portion of the power piston rod is part of a collar extension of the power piston which has the shape of a rearward extension of the power piston rod;

the larger second surface portion of the power piston rod is part of an enlarged piston rod head, the latter having on its forward side a centering recess with which it engages the collar extension of the power piston; and the power piston rod further includes a plurality of axially extending threaded fasteners creating a clamped rigid connection between the power piston rod, the power piston and the piston rod head.

12. A compact hydraulic actuator assembly as defined in any one of claims 1 through 6, further comprising valve means for selectively and independently controlling the supply of pressurized fluid to, and, conversely, the discharge of fluid from:

the low-pressure space of the power cylinder and the connected pressure space of the travel cylinder, or travel cylinders, respectively, on the one hand, and the pressure space of the stationary plunger, on the other hand, for the opening and closing travels of the movable die carrier member;

the pressure space of the annular valve plunger, for the hydraulic closing of the power piston bypass;

the high-pressure space of the power cylinder and the pressure space of the stationary plunger, for the creation of an elevated die closing pressure in the closed position of the die closing unit.

* * * * *